(12) United States Patent
Watari et al.

(10) Patent No.: US 7,948,997 B2
(45) Date of Patent: May 24, 2011

(54) BGP ROUTE EVALUATION METHOD AND DEVICE THEREFOR

(75) Inventors: Masafumi Watari, Saitama (JP);
Tomohiko Ogishi, Saitama (JP);
Shigehiro Ano, Saitama (JP)

(73) Assignee: KDDI Corporation, Tokyo (JP)

( * ) Notice: Subject to any disclaimer, the term of this patent is extended or adjusted under 35 U.S.C. 154(b) by 130 days.

(21) Appl. No.: 12/235,875

(22) Filed: Sep. 23, 2008

(65) Prior Publication Data
US 2009/0262660 A1    Oct. 22, 2009

(30) Foreign Application Priority Data
Sep. 26, 2007   (JP) .................................. 2007-249087

(51) Int. Cl.
*H04L 12/28* (2006.01)
(52) U.S. Cl. ........................................................ 370/401
(58) Field of Classification Search .................. 370/229, 370/230, 230.1, 231, 232, 234, 241, 252, 370/253, 351, 389, 395.1, 395.3, 395.31, 370/400, 401
See application file for complete search history.

(56) References Cited

U.S. PATENT DOCUMENTS

| | | | |
|---|---|---|---|
| 2003/0086422 A1* | 5/2003 | Klinker et al. | 370/389 |
| 2004/0006640 A1* | 1/2004 | Inderieden et al. | 709/242 |
| 2005/0286412 A1* | 12/2005 | Hao et al. | 370/216 |
| 2006/0262776 A1* | 11/2006 | Pollock | 370/352 |
| 2007/0280245 A1* | 12/2007 | Rosberg | 370/392 |

OTHER PUBLICATIONS

"Ipv4 Multihoming Practices and Limitations", Network Working Group; J. Abley et al., Jul. 2005; 13 pages.
"A Border Gateway Protocol 4 (BGP-4)", Rekhter, et al., Standards Track; Network Working Group, 104 pages.

* cited by examiner

*Primary Examiner* — Kwang B Yao
*Assistant Examiner* — Obaidul Huq
(74) *Attorney, Agent, or Firm* — Westman, Champlin & Kelly, P.A.

(57) ABSTRACT

The present invention provides a BGP route evaluation device and method. A message receiving section 101 receives a BGP Update message. A status detecting section 102 detects the active/inactive status of each BGP route on the basis of a pair of prefix and next hop registered in "Announce" and "Withdraw" of the BGP Update message. In a management table 104, the active/inactive status of each BGP route is managed. An update section 103 updates the registration contents of the management table 104 on the basis of the detection result of the active/inactive status. An evaluation section 105 evaluates each BGP route on the basis of the registration contents of the management table 104.

8 Claims, 7 Drawing Sheets

$$\text{ACTIVE RATE (\%)} = \frac{\text{ACTIVE PERIOD } [(t2-t1) + (t4-t3) + (t6-t5)]}{\text{EVALUATION PERIOD } (t6-t1) - \text{EXCLUSION PERIOD}(t5-t4)} \times 100$$

Fig. 3

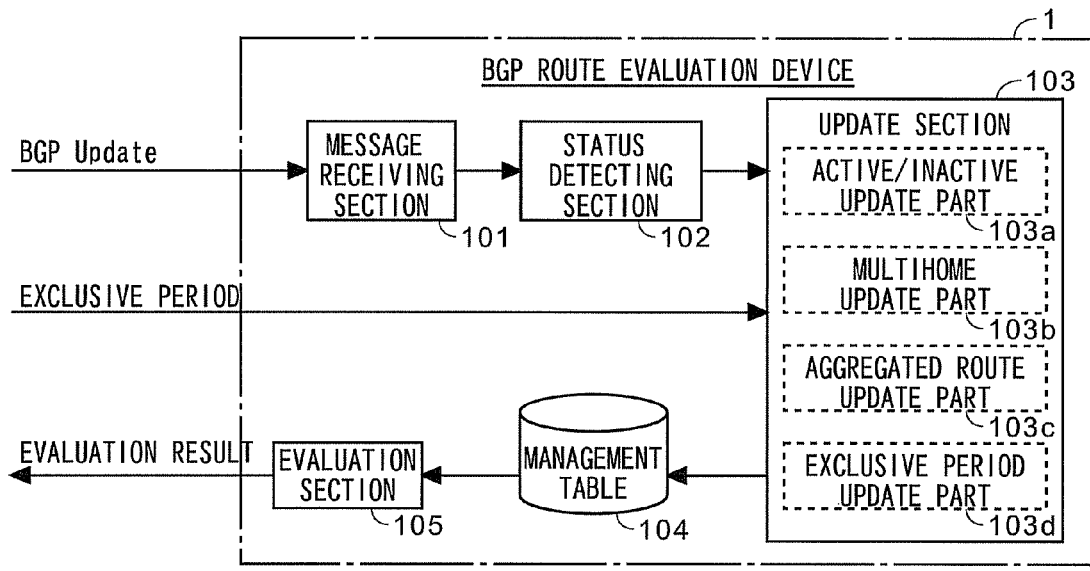

Fig. 5

| PREFIX | ENTRY TYPE | NEXT HOP | ACTIVE/ INACTIVE | EVALUATION START TIME | FINAL UPDATE TIME | ACCUMULATED ACTIVE TIME | ACCUMULATED EXCLUSIVE TIME |
|---|---|---|---|---|---|---|---|
| 192.168.0.0/24 | N | 10.0.0.1 | ACTIVE | 2007/08/10 11:18:55 | – | – | – |
| 192.168.1.0/23 | N | 11.0.0.1 | INACTIVE | 2007/08/10 11:18:55 | 2007/08/10 11:28:55 | 600 sec | – |
| 192.168.2.0/23 | N | 10.0.0.1 | ACTIVE | 2007/08/10 11:18:55 | – | – | – |

Fig. 6

| PREFIX | ENTRY TYPE | NEXT HOP | ACTIVE/ INACTIVE | EVALUATION START TIME | FINAL UPDATE TIME | ACCUMULATED ACTIVE TIME | ACCUMULATED EXCLUSIVE TIME |
|---|---|---|---|---|---|---|---|
| 192.168.0.0/24 | N | 10.0.0.1 | ACTIVE | 2007/08/10 11:18:55 | – | – | – |
| 192.168.1.0/23 | N | 11.0.0.1 | INACTIVE | 2007/08/10 11:18:55 | 2007/08/10 11:28:55 | 600 sec | – |
| 192.168.2.0/23 | N | 10.0.0.1 | ACTIVE | 2007/08/10 11:18:55 | – | – | – |
| 192.168.8.0/24 | N | 11.0.0.1 | ACTIVE | 2007/08/10 11:20:55 | – | – | – |

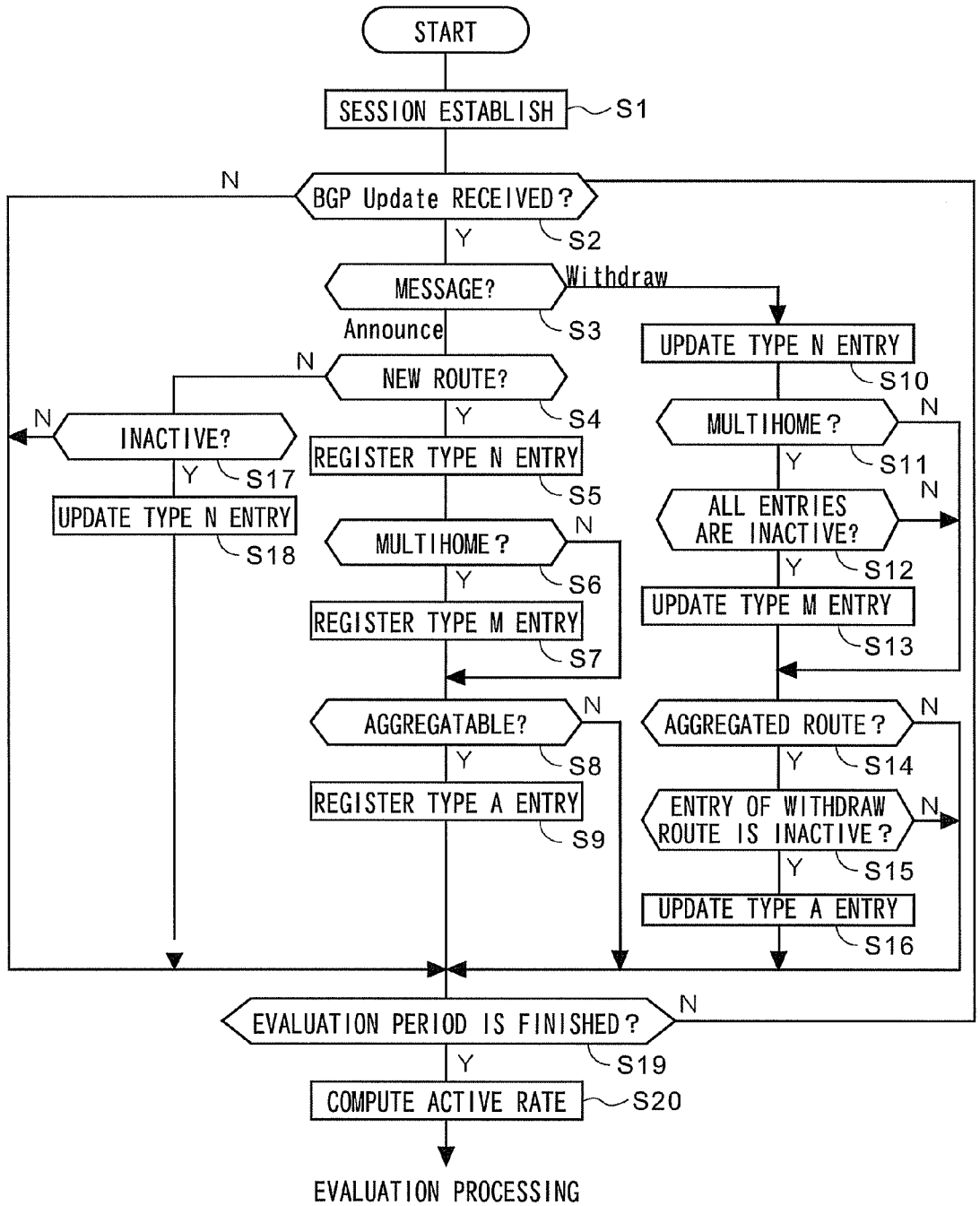

Fig. 7

| PREFIX | ENTRY TYPE | NEXT HOP | ACTIVE/ INACTIVE | EVALUATION START TIME | FINAL UPDATE TIME | ACCUMULATED ACTIVE TIME | ACCUMULATED EXCLUSIVE TIME |
|---|---|---|---|---|---|---|---|
| 192.168.0.0/24 | N | 10.0.0.1 | ACTIVE | 2007/08/10 11:18:55 | - | - | - |
| 192.168.1.0/23 | N | 11.0.0.1 | INACTIVE | 2007/08/10 11:18:55 | 2007/08/10 11:28:55 | 600 sec | - |
| 192.168.2.0/23 | N | 10.0.0.1 | ACTIVE | 2007/08/10 11:18:55 | - | - | - |
| 192.168.8.0/24 | N | 11.0.0.1 | ACTIVE | 2007/08/10 11:20:55 | - | - | - |
|  | N | 12.0.0.5 | ACTIVE | 2007/08/10 11:22:55 | - | - | - |

Fig. 8

| PREFIX | ENTRY TYPE | NEXT HOP | ACTIVE/ INACTIVE | EVALUATION START TIME | FINAL UPDATE TIME | ACCUMULATED ACTIVE TIME | ACCUMULATED EXCLUSIVE TIME |
|---|---|---|---|---|---|---|---|
| 192.168.0.0/24 | N | 10.0.0.1 | ACTIVE | 2007/08/10 11:18:55 | - | - | - |
| 192.168.1.0/23 | N | 11.0.0.1 | INACTIVE | 2007/08/10 11:18:55 | 2007/08/10 11:28:55 | 600 sec | - |
| 192.168.2.0/23 | N | 10.0.0.1 | ACTIVE | 2007/08/10 11:18:55 | - | - | - |
| 192.168.8.0/24 | N | 11.0.0.1 | ACTIVE | 2007/08/10 11:20:55 | - | - | - |
|  | N | 12.0.0.5 | ACTIVE | 2007/08/10 11:22:55 | - | - | - |
|  | M |  | ACTIVE | 2007/08/10 11:22:55 | - | - | - |

Fig. 9

| PREFIX | ENTRY TYPE | NEXT HOP | ACTIVE/ INACTIVE | EVALUATION START TIME | FINAL UPDATE TIME | ACCUMULATED ACTIVE TIME | ACCUMULATED EXCLUSIVE TIME |
|---|---|---|---|---|---|---|---|
| 192.168.0.0/24 | N | 10.0.0.1 | ACTIVE | 2007/08/10 11:18:55 | - | - | - |
| 192.168.1.0/23 | N | 11.0.0.1 | INACTIVE | 2007/08/10 11:18:55 | 2007/08/10 11:28:55 | 600 sec | - |
| 192.168.2.0/23 | N | 10.0.0.1 | ACTIVE | 2007/08/10 11:18:55 | - | - | - |
| 192.168.2.0/24 | N | 10.0.0.1 | ACTIVE | 2007/08/10 11:24:55 | - | - | - |
| 192.168.8.0/24 | N | 11.0.0.1 | ACTIVE | 2007/08/10 11:20:55 | - | - | - |
|  | N | 12.0.0.5 | ACTIVE | 2007/08/10 11:22:55 | - | - | - |
|  | M |  | ACTIVE | 2007/08/10 11:22:55 | - | - | - |

Fig. 10

| PREFIX | ENTRY TYPE | NEXT HOP | ACTIVE/ INACTIVE | EVALUATION START TIME | FINAL UPDATE TIME | ACCUMULATED ACTIVE TIME | ACCUMULATED EXCLUSIVE TIME |
|---|---|---|---|---|---|---|---|
| 192.168.0.0/24 | N | 10.0.0.1 | ACTIVE | 2007/08/10 11:18:55 | - | - | - |
| 192.168.1.0/23 | N | 11.0.0.1 | INACTIVE | 2007/08/10 11:18:55 | 2007/08/10 11:28:55 | 600 sec | - |
| 192.168.2.0/23 | N | 10.0.0.1 | ACTIVE | 2007/08/10 11:18:55 | - | - | - |
| 192.168.2.0/24 | N | 10.0.0.1 | ACTIVE | 2007/08/10 11:24:55 | - | - | - |
|  | A | 192.168.2.0/23 | ACTIVE | 2007/08/10 11:24:55 | - | - | - |
| 192.168.8.0/24 | N | 11.0.0.1 | ACTIVE | 2007/08/10 11:20:55 | - | - | - |
|  | N | 12.0.0.5 | ACTIVE | 2007/08/10 11:22:55 | - | - | - |
|  | M |  | ACTIVE | 2007/08/10 11:22:55 | - | - | - |

Fig. 11

| PREFIX | ENTRY TYPE | NEXT HOP | ACTIVE/ INACTIVE | EVALUATION START TIME | FINAL UPDATE TIME | ACCUMULATED ACTIVE TIME | ACCUMULATED EXCLUSIVE TIME |
|---|---|---|---|---|---|---|---|
| 192.168.0.0/24 | N | 10.0.0.1 | ACTIVE | 2007/08/10 11:18:55 | - | - | - |
| 192.168.1.0/23 | N | 11.0.0.1 | INACTIVE | 2007/08/10 11:18:55 | 2007/08/10 11:28:55 | 600 sec | - |
| 192.168.2.0/23 | N | 10.0.0.1 | ACTIVE | 2007/08/10 11:18:55 | - | - | - |
| 192.168.2.0/24 | N | 10.0.0.1 | ACTIVE | 2007/08/10 11:24:55 | - | - | - |
|  | A | 192.168.2.0/23 | ACTIVE | 2007/08/10 11:24:55 | - | - | - |
| 192.168.8.0/24 | N | 11.0.0.1 | INACTIVE | 2007/08/10 11:20:55 | 2007/08/10 11:27:55 | 420 sec | - |
|  | N | 12.0.0.5 | INACTIVE | 2007/08/10 11:22:55 | 2007/08/10 11:42:55 | 1200 sec | - |
|  | M |  | INACTIVE | 2007/08/10 11:22:55 | 2007/08/10 11:42:55 | 1200 sec | - |

Fig. 12

| PREFIX | ENTRY TYPE | NEXT HOP | ACTIVE/INACTIVE | EVALUATION START TIME | FINAL UPDATE TIME | ACCUMULATED ACTIVE TIME | ACCUMULATED EXCLUSIVE TIME |
|---|---|---|---|---|---|---|---|
| 192.168.0.0/24 | N | 10.0.0.1 | ACTIVE | 2007/08/10 11:18:55 | - | - | - |
| 192.168.1.0/23 | N | 11.0.0.1 | INACTIVE | 2007/08/10 11:18:55 | 2007/08/10 11:28:55 | 600 sec | - |
| 192.168.2.0/23 | N | 10.0.0.1 | ACTIVE | 2007/08/10 11:18:55 | - | - | - |
| 192.168.2.0/24 | N | 10.0.0.1 | ACTIVE | 2007/08/10 11:24:55 | - | - | - |
|  | A | 192.168.2.0/23 | ACTIVE | 2007/08/10 11:24:55 | - | - | - |
| 192.168.8.0/24 | N | 11.0.0.1 | ACTIVE | 2007/08/10 11:20:55 | - | - | - |
|  | N | 12.0.0.5 | INACTIVE | 2007/08/10 11:22:55 | 2007/08/10 11:42:55 | 1200 sec | - |
|  | M |  | ACTIVE | 2007/08/10 11:22:55 | - | - | - |

Fig. 13

| PREFIX | ENTRY TYPE | NEXT HOP | ACTIVE/INACTIVE | EVALUATION START TIME | FINAL UPDATE TIME | ACCUMULATED ACTIVE TIME | ACCUMULATED EXCLUSIVE TIME |
|---|---|---|---|---|---|---|---|
| 192.168.0.0/24 | N | 10.0.0.1 | ACTIVE | 2007/08/10 11:18:55 | - | - | - |
| 192.168.1.0/23 | N | 11.0.0.1 | INACTIVE | 2007/08/10 11:18:55 | 2007/08/10 11:28:55 | 600 sec | - |
| 192.168.2.0/23 | N | 10.0.0.1 | INACTIVE | 2007/08/10 11:18:55 | 2007/08/10 11:44:55 | 1560 sec | - |
| 192.168.2.0/24 | N | 10.0.0.1 | INACTIVE | 2007/08/10 11:24:55 | 2007/08/10 11:45:55 | 1260 sec | - |
|  | A | 192.168.2.0/23 | INACTIVE | 2007/08/10 11:24:55 | 2007/08/10 11:45:55 | 1260 sec | - |
| 192.168.8.0/24 | N | 11.0.0.1 | ACTIVE | 2007/08/10 11:20:55 | - | - | - |
|  | N | 12.0.0.5 | INACTIVE | 2007/08/10 11:22:55 | 2007/08/10 11:42:55 | 1200 sec | - |
|  | M |  | ACTIVE | 2007/08/10 11:22:55 | - | - | - |

| PREFIX | ENTRY TYPE | NEXT HOP | ACTIVE/ INACTIVE | EVALUATION START TIME | FINAL UPDATE TIME | ACCUMULATED ACTIVE TIME | ACCUMULATED EXCLUSIVE TIME |
|---|---|---|---|---|---|---|---|
| 192.168.0.0/24 | N | 10.0.0.1 | ACTIVE | 2007/08/10 11:18:55 | - | - | - |
| 192.168.1.0/23 | N | 11.0.0.1 | INACTIVE | 2007/08/10 11:18:55 | 2007/08/10 11:28:55 | 600 sec | - |
| 192.168.2.0/23 | N | 10.0.0.1 | ACTIVE | 2007/08/10 11:18:55 | - | - | - |
| 192.168.2.0/24 | N | 10.0.0.1 | INACTIVE | 2007/08/10 11:24:55 | 2007/08/10 11:45:55 | 1260 sec | - |
|  | A | 192.168.2.0/23 | ACTIVE | 2007/08/10 11:24:55 | - | - | - |
| 192.168.8.0/24 | N | 11.0.0.1 | ACTIVE | 2007/08/10 11:20:55 | - | - | - |
|  | N | 12.0.0.5 | ACTIVE | 2007/08/10 11:22:55 | - | - | - |
|  | M |  | ACTIVE | 2007/08/10 11:22:55 | - | - | - |

US 7,948,997 B2

BGP ROUTE EVALUATION METHOD AND DEVICE THEREFOR

The present application claims priority of Japanese patent application Serial No. 2007/249087, filed Sep. 26, 2007, the content of which is hereby incorporated by reference in its entirety.

BACKGROUND OF THE INVENTION

1. Field of the Invention

The present invention relates to a BGP route evaluation method for quantitatively evaluating a BGP route on the basis of an active rate, and a device therefor.

2. Description of the Related Art

The Internet is the set of domains each of which includes a small-scale autonomous network system (hereinafter referred to as "AS"), which is held and operated by each organization, as a unit. The respective domains are mutually connected to other specified domain by peering using a border gate protocol (hereinafter referred to as "BGP").

As for a method of enhancing the reliability of external connection using the BGP, a non-patent document 1 discloses multihoming by which connection to a multiple ASs is established at the same time to ensure an alternative route at the time of interference. The using of the multihoming can enhance the availability of external connection and hence can enhance the reliability of the external connection. A non-patent document 2 discloses a best-path selecting algorism in a BGP.

[Non-Patent document 1] IPv4 Multihoming Practices and Limitations, RFC 4116

[Non-Patent document 2] A Border Gateway Protocol 4 (BGP-4), RFC 4271

A traffic transfer in the mutlihoming, in reality, can be achieved only for one destination of connection. The switching of the connection at the time of interference raises the problem of communication interruption for a specified time. To further enhance the availability, it is desired to select a path of the lowest failure rate, but the best-path selecting algorism disclosed in the non-patent document 2 gives higher priority to the shortest path except for control by an operation policy and hence cannot select a path of a lower failure rate.

SUMMARY OF THE INVENTION

The object of the present invention is to provide a BGP route evaluation method capable of quantitatively evaluating a BGP route on the basis of an active rate and a device therefor.

The present invention includes the following means in the BGP route evaluation device for evaluating a BGP route for each prefix of the destination.

Message receiving means for receiving a BGP update message; a management table for managing an accumulated active time of the BGP route for the each prefix of a destination; a route status detecting means for detecting a route status of the BGP route for the each prefix of a destination on the basis of the received BGP update message; update means for updating the accumulated active time of an entry corresponding to the management table on the basis of a detection result of the route status; and evaluation means for computing an active rate of the BGP route reaching the each prefix of a destination on the basis of the accumulated active time. Means for detecting an evaluation exclusion period for the each destination address space; and means for registering the evaluation exclusion period in the management table, wherein the evaluation means computes the active rate of a period from which the evaluation exclusion period is excluded.

Multihome registration means that registers a multihome entry in the management table, the multihome entry having an active time accumulated when a plurality of BGP routes that are identical to each other in the prefix of a destination and that are different from each other in the next hop exist and if at least one of the respective BGP routes reaching the prefix is in an active status.

Multihome registration means that registers a multihome entry in the management table, the multihome entry having an active time accumulated when a plurality of BGP routes that are identical to each other in the prefix of a destination and that are different from each other in the next hop exist and if at least one of the respective BGP routes reaching the prefix is in an active status.

According to the present invention, the following effects can be produced.

The BGP route can be quantitatively evaluated on the basis of the active rate of the BGP route, so that a path of a lower failure rate can be selected.

An intentional inactive period can be excluded from an evaluation period, so that the active rate of the BGP route can be correctly computed.

As to a multihome AS, not only a plurality of BGP routes reaching the prefix of a destination can be individually evaluated, but also the reachability to the prefix of a destination can be quantitatively evaluated aside from the active rate of each of the BGP routes.

Not only each of the BGP routes reaching each of prefixes that are in a relationship in which one prefix is aggregated with the other prefix can be individually evaluated, but also the reachability to the prefix of a destination can be quantitatively evaluated aside from the active rate of each of the BGP routes.

BRIEF DESCRIPTION OF THE DRAWINGS

FIG. 3 is a function block diagram to show the construction of main sections of a BGP route evaluation device.

FIG. 4 is a flow chart to show the operation of one embodiment of the present invention.

FIG. 5 is a diagram (No. 1) that schematically expresses the registration content of a management table.

FIG. 6 is a diagram (No. 2) that schematically expresses the registration content of a management table.

FIG. 7 is a diagram (No. 3) that schematically expresses the registration content of a management table.

FIG. 8 is a diagram (No. 4) that schematically expresses the registration content of a management table.

FIG. 9 is a diagram (No. 5) that schematically expresses the registration content of a management table.

FIG. 10 is a diagram (No. 6) that schematically expresses the registration content of a management table.

FIG. 11 is a diagram (No. 7) that schematically expresses the registration content of a management table.

FIG. 12 is a diagram (No. 8) that schematically expresses the registration content of a management table.

FIG. 13 is a diagram (No. 9) that schematically expresses the registration content of a management table.

DETAILED DESCRIPTION OF THE PREFERRED EMBODIMENTS

Figure 1:
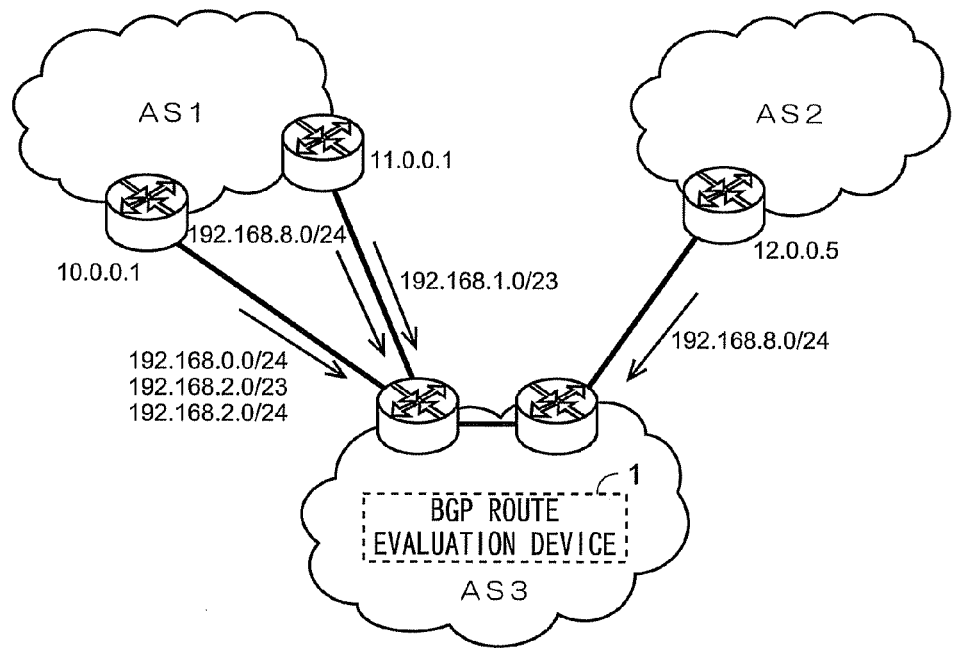
FIG. 1 is a diagram to show one example of a BGP network to which the present invention is applied.

FIG. 1 is a diagram to show one example of a BGP network to which a BGP route evaluation method of the present invention is applied. The next hop for reaching prefixes [192.168.0.0/24], [192.168.2.0/23], and [192.168.2.0/24] from an AS3 is [10.0.0.1], and the next hop for reaching prefix [192.168.1.0/23] from the AS3 is [11.0.0.1], and the next hop for reaching prefix [192.168.8.0/24] from the AS3 is [11.0.0.1] and [12.0.0.5]. That is, the AS3 is multihomed to an AS1 and an AS2.

The BGP speaker of the AS3 has a BGP route evaluation device 1 connected thereto. This BGP route evaluation device 1 computes the active rate of each BGP route starting from the AS3 for each destination address space (prefix in this embodiment) and evaluates each BGP route on the basis of this computation result.

Next, the active rate of a BGP route computed by the BGP route evaluation device 1 will be described with reference to FIG. 2.

In this embodiment, the route status of a BGP route reaching each prefix is detected for specified evaluation periods (t1 to t6) on the basis of the "Announce" and "Withdraw" of a BGP Update message, and the rate of an active period with respect to the evaluation period is computed as an active rate.

Figure 2:
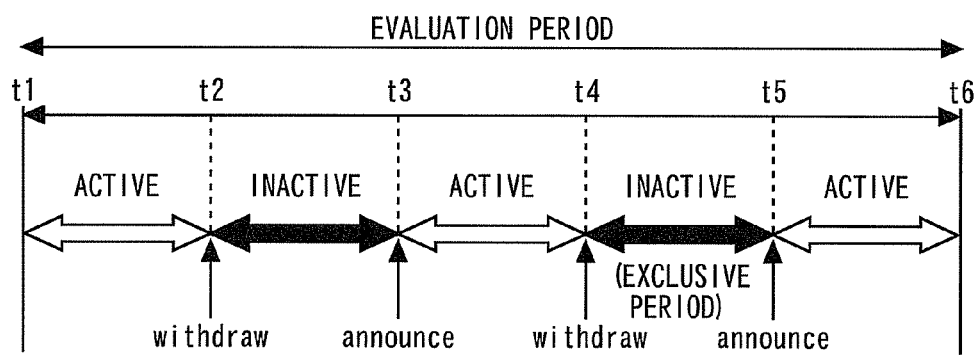
FIG. 2 is a diagram to describe the active rate of a BGP path.

The above-mentioned active period means a time period in which a BGP route is in an active status and, in some cases, becomes the sum of plural periods as shown in FIG. 2. For example, when the route status is varied every six hours in a day, the active period becomes 12 hours and the evaluation period becomes 24 hours, so that the active rate of the BGP route becomes 50%.

However, in the actual Internet, there is a case where an operator announces a BGP Update message intentionally and stops the operation for various reasons including the new allocation of a prefix, the switching of a peer to be connected, regular maintenance, and etc. When such an intentional inactive status can be grasped from external information, the period of the intentional inactive status is excluded as an intentional inactive period from the evaluation period. In the case where it is difficult to grasp the inactive status from the external information, it is also recommendable to define an ordinary interference period as the intentional inactive period.

Taking FIG. 2 as an example, the evaluation period is [t6−t1], and the active periods are [t2−t1], [t4−t3] and [t6−t5], and the inactive periods are [t3−t2] and [t5−t4]. Of these inactive periods, the inactive period [t5−t4] is an intentional inactive period, so that an active rate is found by the following equation (1).

$$\text{active rate (\%)} = \frac{\sum \text{active period}}{\text{evaluation period} - \sum \text{exclusive period}} \times 100 \quad \text{[Equation 1]}$$

$$= \frac{(t_2 - t_1) + (t_4 - t_3) + (t_6 - t_5)}{(t_6 - t_1) + (t_5 - t_4)} \times 100$$

FIG. 3 is a function block diagram of the BGP route evaluation device 1. A message receiving section 101 receives a BGP Update message exchanged between the BGP speakers via the BGP speaker of the AS3. A status detecting section 102 detects the active/inactive status of each BGP route on the basis of a pair of prefix and next hop registered in "Announce" and "Withdraw" of the BGP Update message.

In a management table 104, the active/inactive status of each BGP route is managed. An update section 103 updates the registration contents of the management table 104 on the basis of the detection result of the active/inactive status. An evaluation section 105 evaluates each BGP route on the basis of the registration contents of the management table 104.

The update section 103 includes: an active/inactive update part 103a for updating the active/inactive status of each BGP route; a multihoming update part 103b for managing multihoming to be described later in detail; an aggregated route update part 103c for managing an aggregated route to be described later in detail; and an exclusive period update part 103d for managing an evaluation exclusion period on the basis of an exclusive period information to be input separately.

FIG. 4 is a flow chart to show the operation of this embodiment and mainly shows the operation of the BGP route evaluation device 1. Here, the description will be started from a state in which three entries are already registered in the management table 104 as shown in FIG. 5.

In step 1, a session is established between the BGP evaluation device 1 and the BGP speaker. When a BGP Update message is received in step 2 by the message receiving section 101 via the BGP speaker, it is determined in step 3 by the status detecting section 102 which of "Announce" and "Withdraw" the kind of the message is.

When the kind of the message is "Announce", the routine proceeds to step 4 where it is determined whether or not the message is the information of a new route. Here, when the prefix and the next hop registered in the Announce are [192.168.8.0/24] and [11.0.0.1], respectively, the entry of the pair concerned is not yet registered in the management table 104, and hence it is determined that the route is a new route, and the routine proceeds to step S5. In step S5, as shown in FIG. 6, an entry of the type N in which the pair of informed prefix [192.168.8.0/24] and next hop [11.0.0.1] are identifiers is newly registered in the management table 104 by the active/inactive update part 103a, and the present day and time are registered in its evaluation starting day and time column.

In step S6, whether or not the new route is multihome is determined by the multihoming update part 103b on the basis of whether or not the prefix [192.168.8.0/24] of the newly registered BGP route is already registered in the management table 104 before its registration. Here, the entry the prefix of which is the same as the prefix [192.168.8.0/24] of the new route is not yet registered, so that it is determined that the new route is not multihome, and hence the routine proceeds to step S8.

In step S8, whether or not the new route can be aggregated with the other already registered route is determined by the aggregated route update part 103c on the basis of whether or not the entry the prefix of which includes the prefix [192.168.8.0/24] of the new route is already registered. Here, it is determined that the entry capable of including the prefix [192.168.8.0/24] is not yet registered, so that this processing is finished.

Next, when the prefix and the next hop registered in the Announce received newly in step S2 are [192.168.8.0/24] and [12.0.0.5], respectively, as described above, it is determined that the route is a new route, and hence the routine proceeds to step S5. In step S5, as shown in FIG. 7, the entry of the type N in which the pair of the informed prefix [192.168.8.0/24] and next hop [12.0.0.5] are identifiers is newly registered in the management table 104 by the active/inactive update part 103*a*, and the present day and time are registered in its evaluation starting day and time column.

In step S6, the prefix [192.168.8.0/24] of the newly registered route is already registered in the management table 104 before the registration and hence it is determined that the new route is multihome, so that the routine proceeds to step S7. In step S7, as shown in FIG. 8, as to the new route, the entry of the type M in which only the prefix [192.168.8.0/24] of the new route is the identifier is registered in the management table 104 by the multihoming update part 103*b*, and the present day and time are registered in its evaluation starting day and time column.

In the entry of the type M, when at least one of the plurality of BGP routes reaching the prefix [192.168.8.0/24] of the destination is in the active status, the active time is accumulated, so that when the active rate of the entry of the type M is found, the reachability to the prefix of the destination can be evaluated aside from the active rate of each BGP route.

In step S8, it is determined whether or not the new route can be aggregated with the other already registered route. Here, it is determined that the entry capable of including the prefix [192.168.8.0/24] is not yet registered, so that this processing is finished.

Next, when the prefix and the next hop registered in the Announce newly received in step S2 are [192.168.2.0/24] and [10.0.0.1], respectively, as described above, it is determined that the route is a new route and the routine proceeds to step S5. In step S5, as shown in FIG. 9, the entry of the type N in which the pair of the prefix [192.168.2.0/24] and the next hop [10.0.0.1] are identifiers is newly registered in the management table 104 by the active/inactive update part 103*a*.

Figures 14, 15:
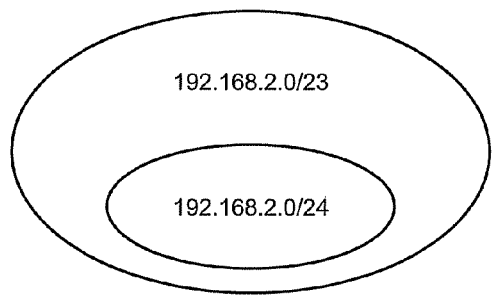
FIG. 14 is a diagram (No. 10) that schematically expresses the registration content of a management table.
FIG. 15 is a diagram to describe the aggregation relationship of prefix.

In step S6, it is determined that the prefix [192.168.2.0/24] of the newly registered route is not yet registered in the management table 104 before its registration, and hence the routine proceeds to step S8. In step S8, as shown in FIG. 15, it is determined that the entry of the prefix [192.168.2.0/23] including the address space of the prefix [192.168.2.0/24] of the new route is already registered in the management table 104, so that the routine proceeds to step S9.

In step S9, as shown in FIG. 10, the entry of the type A in which the prefix of the destination is registered in the prefix column and in which the prefix [192.168.2.0/23] of the route with which the newly registered route is to be aggregated is registered in the next hop column is newly registered in the management table 104 by the aggregated route update part 103*c*.

In the entry of the type A, when the prefix of the destination is aggregated with the other prefix, if at least one of the BGP route reaching the prefix of the destination and the BGP route reaching the other prefix is in the active status, the active time is accumulated, so that the reachability to the prefix of the destination can be evaluated aside from the active rate of each BGP route.

On the other hand, when it is determined in step S3 that the BGP Update message is "Withdraw", the routine proceeds to step S10. Here, firstly, a case in which the prefix and the next hop, which are registered in the Withdraw, are [198.168.8.0/24] and [12.0.0.5], respectively, will be described by way of example.

In step S10, as to the entry of the type N that is identified by the pair of the prefix and the next hop which are registered in the message, the route information thereof is updated. Here, a lapse time from the final update day and time to the present day and time is added to an accumulated active time that is already registered, whereby the final update day and time are updated to the present day and time. In this regard, when the final update day and time are not yet registered, a lapse time from the evaluation starting day and time to the present day and time is added to the accumulated active time that is already registered, whereby the present day and time are newly registered as the final update day and time.

In step S11, it is determined whether or not a withdrawn route informed by Withdraw is multihome. Here, as to the prefix [198.168.8.0/24], the entry of the type M is already registered, so that it is determined that the withdrawn route is multihome, and the routine proceeds to step S12. In step S12, it is determined whether or not the entries of the type N of all BGP routes which are in multihome relationship with each other are in the inactive status. When all entries are in the inactive status, the routine proceeds to step S13. In step S13, the final update day and time and the accumulated active time of the entry of the type M are updated in the same way described above.

FIG. 11 is a diagram to show the registration contents of the management table 104 in which the entry of the type M is updated. As to the entry the prefix of which is [198.168.8.0/24], the entry of the type N in which the next hop is [12.0.0.5] and the entry of the type M have the final update day and time and the accumulated active time updated.

In contrast to this, when it is determined in the step S12 that the other entry of the type N which is in a mutlihome relationship with the withdrawn route is in the active status, as shown in FIG. 12, only the entry of the type N in which the next hop is [12.0.0.5] is updated, and the entry of the type M is not updated.

In other words, except for a case in which all entries which are in a multihome relationship with the entry of the type M are in the inactive status, the entry of the type M is determined to be in the active status and hence has its active time accumulated, so that by referring to the entry of the type N, not only the route statuses of the individual BGP routes can be evaluated, but also by referring to the entry of the type M, the reachability to the prefix of the destination can be evaluated.

In step 14, it is determined whether or not the withdrawn route informed by the Withdraw is an aggregated route. However, this withdrawn route is not the aggregated route, so that the routine proceeds to step S19.

In contrast to this, when the prefix and the next hop having been registered in the Withdraw are [192.168.2.0/24] and [10.0.0.1], respectively, in the step S10, the entry of the type N corresponding to these is updated. In step S11, it is determined that the withdrawn route is not multihome, so that the routine proceeds to step S14. In step S14, the entry of the type A in which the prefix is [192.168.2.0/24] is already registered, the withdrawn route is detected to be an aggregated route, and the routine proceeds to step S15.

In step S15, it is determined whether or not the entry [192.168.2.0/23] with which the withdrawn route is aggregated is in the inactive status. When the entry [192.168.2.0/23] is in the inactive status, the routine proceeds to step S16. In step S16, as one example is shown in FIG. 13, the final update day and time and the accumulated active time of the entry of the type A are updated in the manner described above.

In contrast to this, when the entry [198.168.2.0/23] with which the withdrawn route is aggregated is in the active status, as one example is shown in FIG. 14, only the entry of the type N is updated and the entry of the type A is not updated.

In other words, as to the entry of the type A, when the prefix of the destination is aggregated with the other prefix, even if the BGP route reaching the prefix of the destination is in the inactive status, if the BGP route reaching the other prefix that aggregates this inactive route is in the active status, the entry of the type A is not made inactive but the active time is accumulated. Thus, by referring to the entry of the type N, not only the active status of the individual BGP route can be evaluated, but also by referring to the entry of the type A, the reachability to the prefix of the destination can be evaluated.

On the other hand, when it is determined in the step S4 that the route informed by the received "Announce" is not a new route, the routine proceeds to step S17 where it is determined whether or not the route is in the inactive status. When it is determined that the route is in the inactive status, the routine proceeds to step S18 where as to the entry corresponding to the type N, the final update day and time of the entry is updated to the present day and time and where the status of the entry is changed from the inactive status to the active status.

In step S19, it is determined whether or not a specified evaluation period is finished. Until the specified evaluation period is finished, the routine returns to the step S2 to prepare for receiving the next BGP update message. When the specified evaluation period is finished, the routine proceeds to step S20 where the active rate of each entry is computed on the basis of the equation (1), and then each BGP route and the reachability to each prefix are evaluated on the basis of the active rate.

What is claimed is:

1. A BGP route evaluation device for evaluating the reachable period of each BGP route for each destination address space, comprising:

message receiving means for receiving a BGP update message;

route status detecting means for detecting whether each BGP route is active or inactive on the basis of the received BGP update message, where the BGP route that is announced reachable is detected as active;

a management table for managing a cumulative period of active time of each BGP route;

update means for updating the corresponding cumulative period of active time of the management table on the basis of a detection result of each BGP route status; and evaluation means for computing the ratio of the cumulative period of active time against a given evaluation period for each BGP route;

means for detecting periods of which the evaluation period is excluded for BGP routes that are intentionally withdrawn by operators; and means for registering the evaluation exclusion period in the management table, wherein the evaluation means computes the ratio of cumulative period of active time by excluding the exclusion period from the given evaluation period.

2. The BGP route evaluation device according to claim 1, wherein in the management table, each BGP route entry is managed with a pair of prefix and next hop.

3. The BGP route evaluation device according to claim 2, comprising:

multihome registration means for multiplying entries registered in the management table for BGP routes that have more than one next hop, wherein the management table, the status for this BGP route is considered active if at least one of the entry remain active.

4. The BGP route evaluation device according to claim 2, comprising:

aggregated route registration means for multiplying entries registered in the management table for BGP routes that can be aggregated by other BGP routes, wherein the management table, the status for this BGP route is considered active if at least one of the entry remain active.

5. A BGP route evaluation method for evaluating the reachable period of each BGP route, comprising:

a management table for managing a cumulative period of active time for each BGP route;

the step of receiving a BGP update message;

the step of detecting whether each BGP route is active or inactive on the basis of the received BGD update message, where the BGP route that is announced reachable is detected as active;

the step of updating the corresponding cumulative period of active time in the management table on the basis of a detection result of the route status; and the step of computing the ratio of the cumulative period of active time against a given evaluation period for each BGP route;

the step of detecting periods of which the evaluation period is excluded from BGP routes that are intentionally withdrawn by operators; and the step of registering the evaluation exclusion period in the management table, wherein the computing step computes the ratio of cumulative period of active time by excluding the exclusion period from the given evaluation period.

6. The BGP route evaluation method according to claim 5, wherein in the management table, each BGP route entry is managed with a pair of prefix and next hop.

7. The BGP route evaluation method according to claim 6, comprising:

the step of registering multiple entries in the management table for BGP routes that have more than one next hop, where the status for this BGP route is considered active, if at least one of the entry remain active.

8. The BGP route evaluation method according to claim 6, comprising:

the step of registering multiple entries in the management table for BGP routes that can be aggregated by other BGP routes, where the status for this BGP route is considered active if at least one of the entry remain active.

* * * * *